(12) United States Patent
Casey et al.

(10) Patent No.: US 7,917,328 B2
(45) Date of Patent: Mar. 29, 2011

(54) TRACKING THERMAL MINI-CYCLE STRESS

(75) Inventors: Jon A. Casey, Poughkeepsie, NY (US);
Michael S. Floyd, Cedar Park, TX (US);
Soraya Ghiasi, Boulder, CO (US);
Kenneth C. Marston, Poughquag, NY (US); Jennifer V. Muncy, Ridgefield, CT (US); Malcom S. Ware, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 12/194,606

(22) Filed: Aug. 20, 2008

(65) Prior Publication Data
US 2010/0049466 A1    Feb. 25, 2010

(51) Int. Cl.
*G06F 19/00*    (2006.01)
(52) U.S. Cl. ......................................... 702/132; 374/10
(58) Field of Classification Search .................. 702/132, 702/182–185
See application file for complete search history.

(56) References Cited

U.S. PATENT DOCUMENTS

| 5,481,210 | A | 1/1996 | Genzel |
| 5,943,206 | A | 8/1999 | Crayford |
| 6,212,644 | B1 | 4/2001 | Shimoda et al. |
| 6,260,998 | B1 * | 7/2001 | Garfinkel et al. ............... 374/57 |
| 6,363,490 | B1 * | 3/2002 | Senyk ........................... 713/300 |
| 6,847,911 | B2 | 1/2005 | Huckaby et al. |
| 6,908,227 | B2 | 6/2005 | Rusu et al. |
| 7,214,910 | B2 | 5/2007 | Chen et al. |
| 7,293,186 | B2 | 11/2007 | Thomas et al. |
| 2006/0255924 | A1 * | 11/2006 | Ray et al. ...................... 340/444 |

OTHER PUBLICATIONS

Reza Ghaffarian, Accelerated Thermal Cycling and Failure Mechanisms for BGA and CSP Assemblies, Dec. 2000, Journal of Electronic Packaging, vol. 122, Issue 4, (6 pages).*
Cui, H., Accelerated Temperature Cycle Test and Coffin-Manson Model for Electronic Packaging, Jan. 24-27, 2005, Reliability and Maintainability Symposium 2005. Proceedings. Annual, p. 556-560.*
USPTO U.S. Appl. No. 12/194,620, Image File Wrapper printed from PAIR on Jul. 1, 2010, 1 page.
Smith, James H. et al., "Self-Consistent Temperature Compensation for Resonant Sensors with Application to Quartz Bulk Acoustic Wave Chemical Sensors", http://www.sandia.gov/mstc/technologies/micromachines/tech-info/bibliography/docs/Tr95voc.pdf, Transducers, Jun. 1995, 5 pages.

* cited by examiner

*Primary Examiner* — Edward Raymond
(74) *Attorney, Agent, or Firm* — Francis Lammes; Stephen J. Walder, Jr.; Diana R. Gerhardt

(57) ABSTRACT

Monitoring temperature excursions an assembly experiences over a life of the assembly is provided. A determination is made as to whether the assembly has been in service beyond a predetermined end of life objective. Responsive to the assembly failing to be in service beyond the predetermined end of life objective, a new temperature value associated with the assembly is read. A modifier value for a figure of merit (FOM) value is computed and added to a cumulative figure of merit value. The cumulative figure of merit value is compared to a cumulative stress figure of merit budget. Responsive to the cumulative figure of merit value exceeding the cumulative stress figure of merit budget, an identified stress management solution is implemented.

20 Claims, 4 Drawing Sheets

TRACKING THERMAL MINI-CYCLE STRESS

BACKGROUND OF THE INVENTION

1. Field of the Invention

The present application relates generally to an improved data processing apparatus and method and more specifically to an apparatus and method for tracking thermal mini-cycle stress over the life of an assembly.

2. Background of the Invention

As computer and other electronic systems have increased performance over time, the power consumed to enable the performance has increased dramatically. Up until recently power management has mostly been a reliability issue associated with the max temperatures components or subassemblies may experience. However, recently the absolute magnitude of the energy consumed in the operation of these systems, especially in large data centers, has prompted the generation of a Standard Performance Evaluation Corporation power (SPECpower™) benchmark. This benchmark is an assessment mechanism to ensure that such systems are designed to minimize energy consumption by significantly reducing the power consumed during those periods in which little productivity is asked of the system.

A system behavior which requires significant power during periods of high production, but requires very little power consumption during idle or low production periods, will tend to experience large variations in temperature depending upon the nature of the thermal cooling paths and the work load demands on the system. These temperature variations may cause failures due to mechanical stress and strain induced fatigue for structures that are composed of materials with varying coefficients of thermal expansion (CTE). Too many thermal cycles of too high a magnitude may result in such failures. In a modern computer system the first level packaging, especially that using organic laminate carrier technology as a carrier for a relatively large silicon die with the processor circuits, has just such large CTE mismatch between carrier and die. In some game applications the organic carrier modules have been shown to be limited to ~10K thermal cycles resulting from power on and off of those modules in application conditions. Exceeding those thermal cycle counts for those temperature excursions will result in either destruction of the thermal interface between the backside of the die and the facing face of the module lid, the back end of line (BEOL) of the chip that includes the metallization and dielectric material that interconnects the transistors and other circuit elements that make up the die, or even the C4 solder attach interface electrically connecting the die circuits to the carrier circuits.

Variations in size of the die, the thermal interface and underfill materials, the make up of the organic carrier and module lid, the second level attach method to the carrier circuit card, the temperature excursion magnitude have been shown to influence the number of thermal cycles that an assembly can withstand before significant deterioration is detectable. In other applications, such as a large processor die on an organic package, the total power on/off cycles which result in thermal cycles of 60° Celsius or more will cause end of life CTE mismatch induced fatigue failures after ~1250 cycles. Lower magnitude thermal cycles on the order of 20° Celsius will allow many more cycles (>40000 over a 40000 power on hour assembly life).

BRIEF SUMMARY OF THE INVENTION

In one illustrative embodiment, a method, in a data processing system, is provided for monitoring temperature excursions an assembly experiences over a life of the assembly. The illustrative embodiments determine if the assembly has been in service beyond a predetermined end of life objective. Responsive to the assembly failing to be in service beyond the predetermined end of life objective, the illustrative embodiments read a new temperature value associated with the assembly. The illustrative embodiments compute a modifier value for a figure of merit (FOM) value and add the modifier value to a cumulative figure of merit value. The illustrative embodiments compare the cumulative figure of merit value to a cumulative stress figure of merit budget. Responsive to the cumulative figure of merit value exceeding the cumulative stress figure of merit budget, the illustrative embodiments implement an identified stress management solution.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
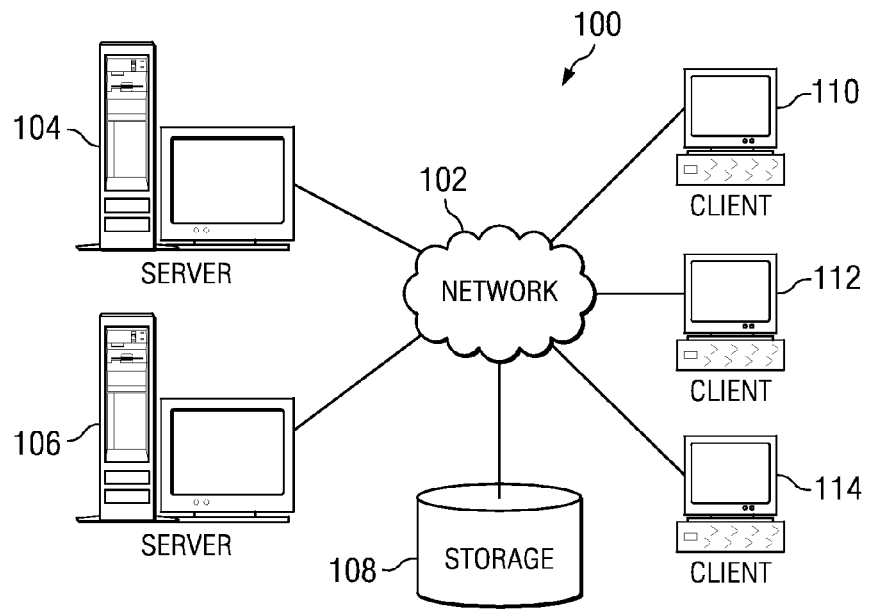
FIG. 1 depicts a pictorial representation of an exemplary distributed data processing system in which aspects of the illustrative embodiments may be implemented.

As will be appreciated by one skilled in the art, the present invention may be embodied as an apparatus, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
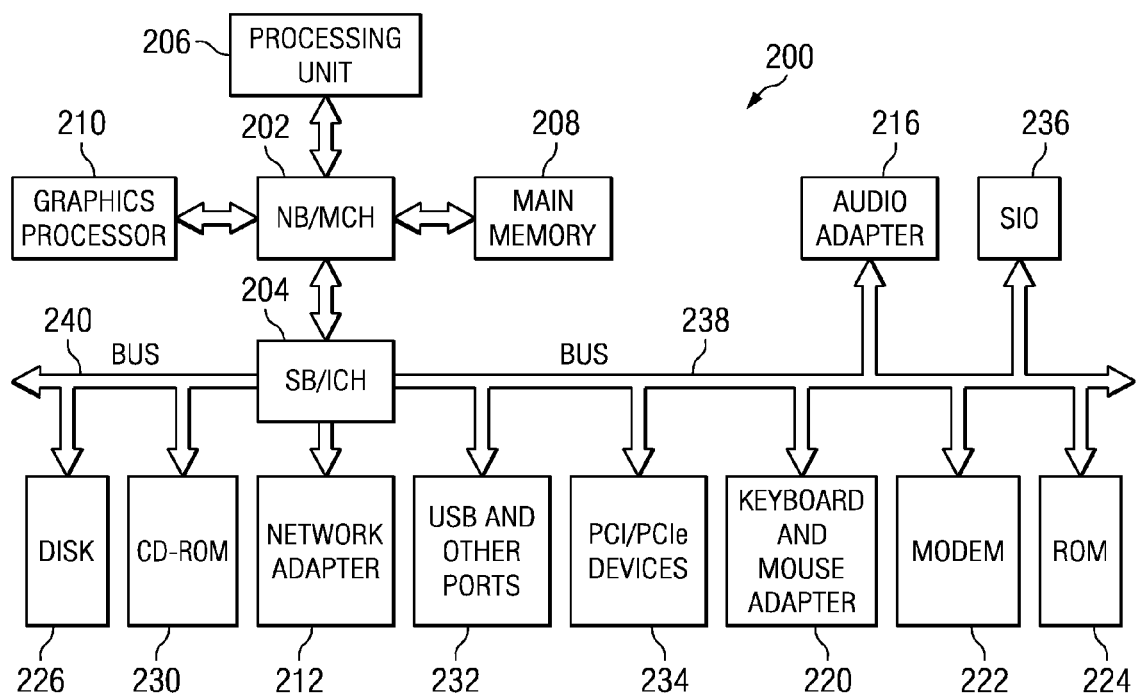
FIG. 2 depicts a block diagram of an exemplary data processing system in which aspects of the illustrative embodiments may be implemented.

The illustrative embodiments provide a mechanism that monitors the temperature excursions an assembly experiences over the life of the assembly, including magnitudes, number of thermal cycles, and the like. Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a single data processing device implementation of a mechanism that monitors the temperature excursions a assembly experiences over the life of the assembly, this is only exemplary and is not intended to state or imply any limitation with regard to the features of the present invention. To the contrary, the illustrative embodiments are intended to include distributed data processing environments and embodiments in which the temperature excursions an assembly experiences over its life may be monitored.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide mechanisms for monitoring the temperature excursions an assembly experiences over the life of the assembly, including magnitudes, number of thermal cycles, and the like. Depending upon the nature of the assembly, a stress figure of merit (FOM) may be computed continuously, or at appropriate intervals, based upon stress figure of merit contributors for thermal excursion events. The FOM may correlate to stress testing results using industry standard tests for qualifying electronic parts. These tests may be referred to as Accelerated Thermal Cycling (ATC) tests. A manufacturer may test assemblies, such as a processor module, a memory module, or the like, when qualifying the technology and design and discover how many ATC cycles the design/technology for that assembly should survive through such an assembly's expected installation life. The determined ATC cycles may then form the amount a budget accumulates over the installation life of the assembly. This FOM may be compared to the accumulated budget as the life of the assembly progresses. The budget may be composed to assure that complying with such a budget will result in an acceptable failure rate and expected life of the assembly. If the assembly's FOM value stays below this number, a manufacturer may not expect assemblies to break because of thermal mini-cycle stresses. If the budget is exceeded, then the nature of the power management would be altered such that further activities that may cause temperature excursions which could add to fatigue stress are limited until such time as the accumulated stress figure of merit will be under the budget.

Figure 3:
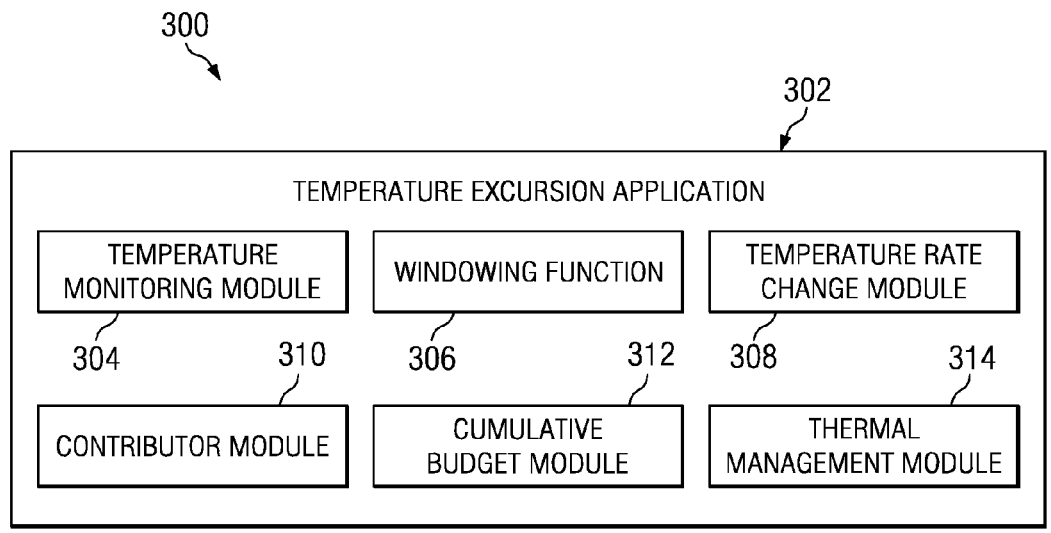
FIG. 3 depicts a functional block diagram of a data processing system that monitors the temperature excursions an assembly experiences over the life of the assembly in accordance with an illustrative embodiment.
Figure 4:
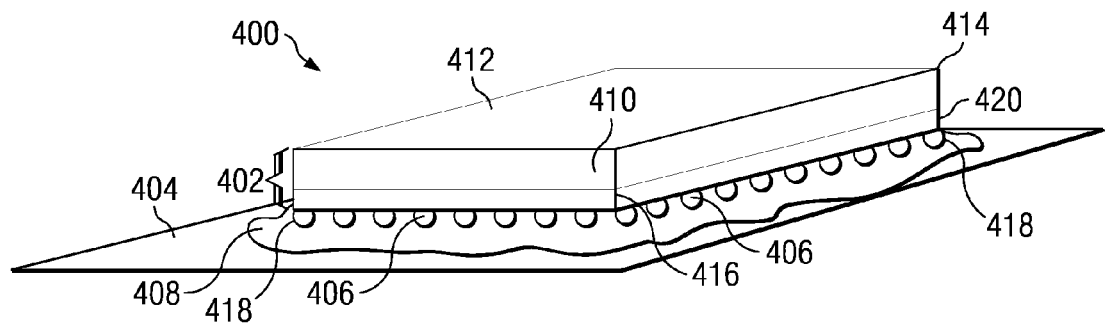
FIG. 4 depicts an exemplary illustration of areas vulnerable to fatigue within an assembly in accordance with an illustrative embodiment.

FIG. 3 depicts a functional block diagram of a data processing system that monitors the temperature excursions an assembly experiences over the life of the assembly in accordance with an illustrative embodiment. Within data processing system 300, temperature excursion application 302 uses temperature monitoring module 304 to monitor temperature excursions at vulnerable areas on vulnerable assemblies. An example of these vulnerable areas is depicted in FIG. 4. Vulnerability is a function of coefficients of thermal expansion (CTE) mismatch between materials, stress, strain, relaxation, fatigue fragility of materials, boundaries between materials, or the like. Temperature monitoring module 304 may extrapolate temperature excursions from sensors not locally placed, measured power, measured workload, or the like. If the temperature excursion is based upon measured power and/or measured workload, then temperature monitoring module 304 may apply windowing function 306 to extrapolate the temperature excursions used to estimate stress figure of merit contributors. Ideally, since the stress and strain of CTE mismatched assemblies may be the accumulation of the expansion or contraction over a relatively large area, some combination of measured temperatures within the stress contribution area may need to be computed.

Figure 5:
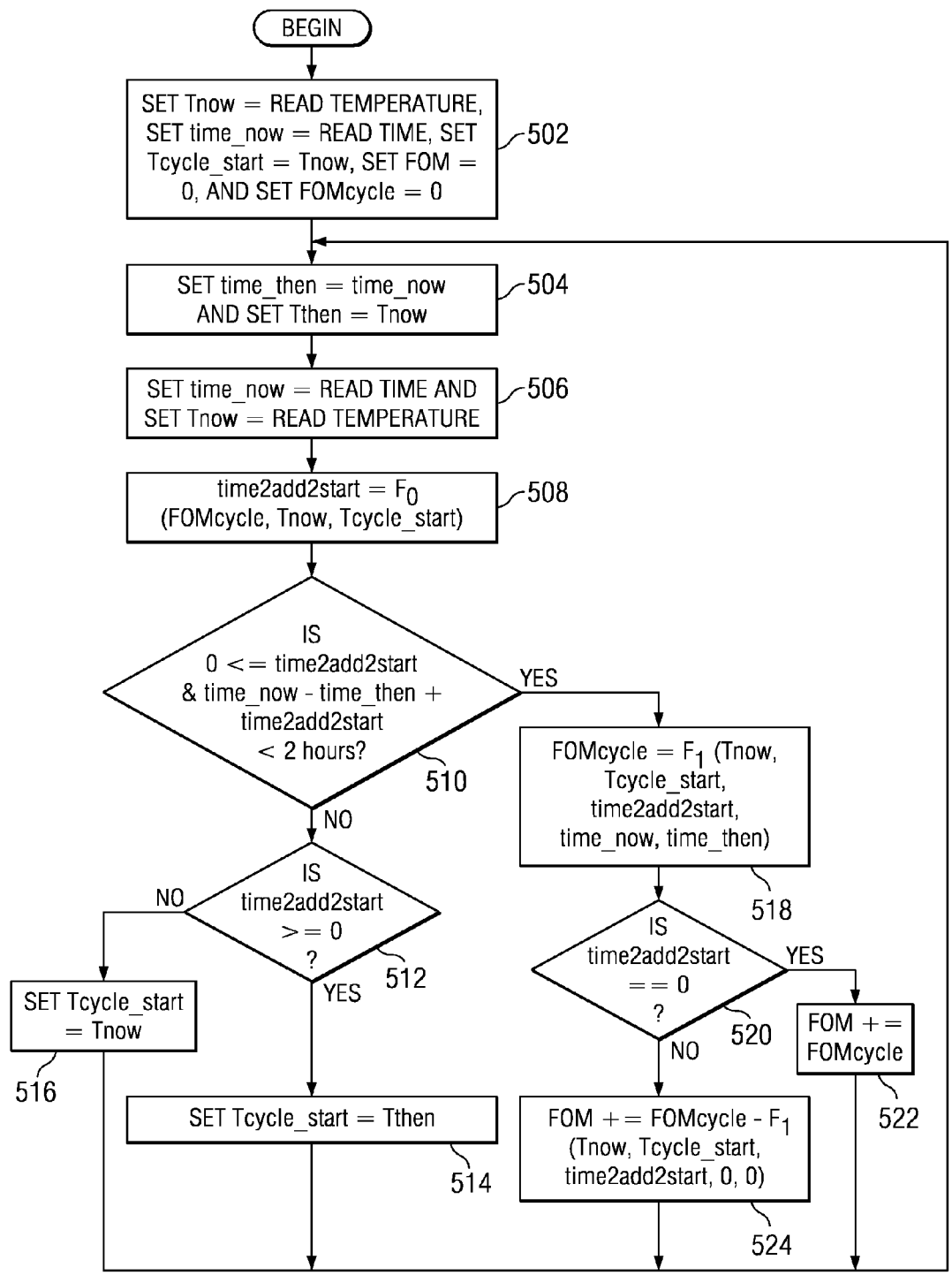
FIG. 5 depicts an exemplary process used to calculate a figure of merit modifier in accordance with an illustrative embodiment.

Data processing system 300 may also comprise temperature rate change module 308 to calculate rates at which the temperatures, monitored by temperature monitoring module 304, change as compared to rates of workload (hence power) change. Additionally, temperature rate change module 308 may be used to compute modifiers to the stress figure of merit contributors. Temperature excursion application 302 may further comprise contributor module 310 to identify stress figure of merit contributors based upon characteristics of the assembly, such as the thermal excursion magnitude, direction, and rate of change. The accumulation of all figure of merit contributors over the life of the assembly amounts to the expected amount of cumulative stress allowed for the average assembly life expectancy. Ideally, if stress or strain gauges are designed near or at the vulnerable fatigue points, then data from these sense points may augment or supplant the temperature excursion measurements. An exemplary process used to calculate a figure of merit is illustrated in FIG. 5.

In addition to contributor module 310, temperature excursion application 302 may comprise cumulative budget module 312 to compute a cumulative stress figure of merit budget over the life of the assembly, which does not exceed that required to meet the average assembly life expectancy. The cumulative stress figure of merit budget, in its simplest form, is a linear accumulation of stress allowed from the initial power on of the assembly to the assembly's projected end of installed life. However, cumulative budget module 312 may consider other profiles. In fact, depending upon the workload applications intended for any particular application, cumulative budget module 312 may utilize a different cumulative stress figure of merit budget profile for each application. If the measured cumulative stress figure of merit is below the budget at any given time, then the assembly operates with whatever its power management algorithms are normally set at. Otherwise, temperature excursion application 302 may change the power management control to mitigate the thermal stress with stress management algorithms. If there are several levels of stress management, then temperature excursion application 302 may employ multiple budget profiles to determine which stress management algorithm to employ (i.e. if the workload is not severely stressing the assembly as observable by how far over the lowest cumulative stress budget the assembly is presently at, then a more energy efficient stress management algorithm would be employed.).

Once a stress management algorithm is identified, then temperature excursion application 302 may comprise thermal management module 314 to implement the identified stress management algorithm when the cumulative stress budget profile is exceeded. Possible management solutions implemented by thermal management module 314 may comprise the addition of pseudo workloads during periods that there is no workload demand, suspending entry into nap modes (and turbo modes for situations where this would not impact customer perceived performance), delaying resumption of process activity on a core by a small time period to effectively merge high power consuming processes without substantially impacting perceived performance, dynamically throttling clock frequency and voltage to an average performance level that regulates mini-cycle stress at the cumulative criteria, scheduling housekeeping tasks to processor cores in which a further temperature decline would result in a mini-cycle of significance, scheduling processes over available cores and threads in order to minimize thermal excursions (as opposed to junction temperatures) per the cumulative thermal mini-cycle stress budget, or the like. A thermal mini-cycle is a temperature excursion that may be relatively small in temperature variations as compared to power on/off cycles, but occur with higher frequency. Thermal mini-cycles are more prevalent and have higher magnitudes in state of the art processors employing aggressive power management algorithms that throttle down circuits so these circuits do not consume power during the times no calculations or other processor activities are required.

FIG. 4 depicts an exemplary illustration of areas vulnerable to fatigue within an assembly in accordance with an illustrative embodiment. Assembly 400 is depicted as a processor chip 402 mounted on laminate carrier 404 using controlled collapse chip connector (C4) balls 406 and underfill 408. Assembly 400 may also comprise heat sink (not shown) mounted on the back of surface 412 of processor chip 402 and thermal sensor 410 which may be located within processor chip 402. Areas in assembly 400 that may be vulnerable to fatigue are the thermal interface between the heat sink and surface 412 of processor chip 402 indicated by arrow 414, the back end of line (BEOL) 420 of processor chip 402 that includes the metallization and dielectric material that interconnects the transistors and other circuit elements that make up processor chip 402 indicated by arrow 416, the C4 solder attach interface electrically connecting the circuits of processor chip 402 to any carrier circuits indicated by arrow 418, or the like.

FIG. 5 depicts an exemplary process used to calculate a figure of merit modifier in accordance with an illustrative embodiment. The process of calculating a figure of merit begins with the first time the data processing system is ever initialized. At the time of initialization, a contributor module, such as contributor module 310 of FIG. 3, sets a Temperature now (Tnow) variable value equal to an initial temperature read by a thermal sensor associated with the assembly, sets a current time (time_now) variable value equal to the time at which the data processing system is initialized, and sets a start of the current thermal cycle (Tcycle_start) variable value indicating the temperature at the start of the current thermal cycle equal to Tnow (step 502). Also at step 502 at the time of initialization, the contributor module sets a cumulative figure of merit (FOM) variable value and a current thermal cycle (FOMcycle) variable value associated with the current thermal cycle equal to zero.

Once the system has been initialized at step 502, the contributor module sets the time_then variable value and Tthen variable value to the values of variables time_now and Tnow, respectively (step 504). Once the time_then and Tthen variable values are set, the contributor module reads a new time value and new temperature value and writes the new values into variables time_now and Tnow (step 506). The contributor module then calculates a time2add2start variable value as a time to add to the duration for calculating the FOMcycle (step 508) using the following equation:

$$time_{2\,add\,2\,start} = \left\{ \begin{array}{c} \left( \left(\frac{FOM_{cycle}}{0.5}\right) \times \left|\frac{T_{now} - T_{cycle\_start}}{100}\right|^{-1.9} \times \right)^{3} \\ (15\,\text{min})^{1/3} \times \\ e^{\left[\frac{1414}{(273+max(T_{cycle\_start},T_{now}))}\right] - \frac{1414}{373}} \end{array} \right\}$$

Once the contributor module calculates the time2add2start variable value, the contributor module determines if the current thermal cycle is no longer contributing to a FOMcycle increase by determining if the length of time since the temperature last changed direction as given by the time2add2start variable summed with the difference between time_now and time_then is longer than 2 hours or if the length of time since the temperature last changed direction as given by the time2add2start variable has changed direction so that the time2add2start variable is a negative value (step 510). If at step 510, the length of time since the temperature last changed direction as given by the time2add2start variable summed with the difference between time_now and time_then is longer than 2 hours or the length of time since the temperature last changed direction as given by the time2add2start variable has changed direction so that the time2add2start is a negative value, the operation proceeds to step 512. At step 512 the contributor module determines if the time2add2start variable value is positive or equal to zero.

If at step 512 the time2add2start variable value is positive or zero, then the contributor module records the previous temperature reading Tthen into Tcycle_start for subsequent calculations as the current thermal cycle is still completing (step 514), with the operation returning to step 504 thereafter to continuously update the FOM variable as an indicator of accumulated stress the assembly monitored has experienced over its installed life. If at step 512 the time2add2start variable value is negative, the contributor module records the current temperature reading Tnow into Tcycle_start for following calculations as either a new thermal cycle is beginning or is set to begin (step 516), with the operation returning to step 504 thereafter to continuously update the FOM variable as an indicator of accumulated stress the assembly monitored has experienced over its installed life.

If at step 510, the time2add2start variable value is within the range to contribute to the FOMcycle stress indicator, then the contributor module calculates a FOMcycle modifier, which is the FOMcycle contribution for the thermal cycle currently being evaluated (step 518) using the following equation.

$$FOM_{cycle} = 0.5 \times \left|\frac{T_{now} - T_{cycle\_start}}{100}\right|^{1.9} \times \left(\frac{15\,\text{min}}{time_{2\,add\,2\,start} -}\right)^{-1/3} \times$$
$$e^{\left[\frac{1414}{373} - \frac{1414}{(273+max(T_{cycle\_start},T_{now}))}\right]}$$

Once the FOMcycle modifier is calculated, the contributor module determines if the time2add2start variable value is equal to zero (step 520). If at step 520 the time2add2start variable value is zero, then the contributor module adds the FOMcycle value into the FOM value (step 522), with the operation retuning to step 504 thereafter to continuously update the FOM variable as an indicator of accumulated stress the assembly monitored has experienced over its installed life. If at step 520 the time2add2start variable value is not zero, then the contributor module adds the FOMcycle value to the FOM value and subtracts the virtual contribution of the portion that was added due to the time2add2start value (step 524), with the operation retuning to step 504 thereafter to continuously update the FOM variable as an indicator of accumulated stress the assembly monitored has experienced over its installed life. The virtual contribution of the portion that was added due to the time2add2start value is calculated using the following equation:

$$FOM_{cycle} = 0.5 \times \left|\frac{T_{now} - T_{cycle\_start}}{100}\right|^{1.9} \times \left(\frac{15\,\text{min}}{time_{2\,add\,2\,start}}\right)^{-1/3} \times$$

-continued $$e\left[\frac{1414}{373} - \frac{1414}{(273+max(T_{cycle\_start}, T_{now}))}\right]$$

Thus, the illustrative embodiments continuously update a FOM variable as an indicator of accumulated stress of an assembly over the installed life of the assembly. It should be obvious to those skilled in the state of the art that simplifications to the algorithm including linearization of equations can be done to predict failures more economically, but with some degradation in accuracy.

Figure 6:
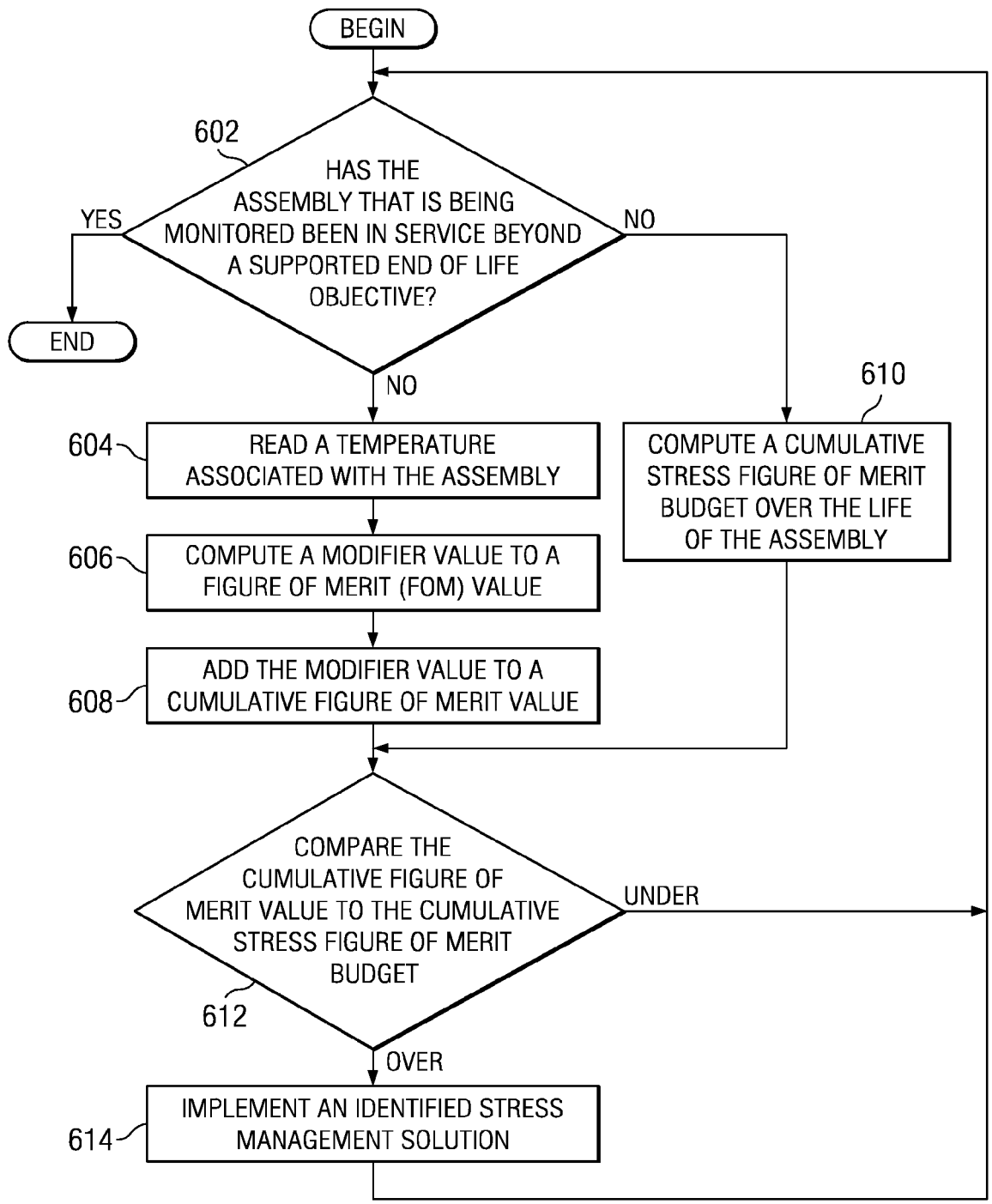
FIG. 6 is a flowchart outlining an exemplary operation for monitoring temperature excursions an assembly experiences over the life of the assembly and reacting to excessive temperature excursions in a data processing system in accordance with an illustrative embodiment.

FIG. 6 is a flowchart outlining an exemplary operation for monitoring temperature excursions an assembly experiences over the life of the assembly and reacting to excessive temperature excursions in a data processing system in accordance with an illustrative embodiment. As the operation begins, the temperature excursion module determines if the assembly that is being monitored has been in service beyond a supported end of life objective (step 602). If at step 602 the time that the assembly has been in service exceeds the predetermined end of life value, then the operation ends. If at step 602 the time that the assembly has been in service fails to exceed the predetermined end of life value, then a temperature monitoring module within the temperature excursion module reads a temperature associated with the assembly (step 604). A temperature rate change module within the temperature excursion module computes modifiers to the stress figure of merit contributors (step 606). The accumulation of all figure of merit contributors over the life of the assembly are added to a cumulative figure of merit value for the assembly life expectancy (step 608).

Also at step 602, if the time that the assembly has been in service fails to exceed the predetermined end of life value, a cumulative budget module within the temperature excursion module computes a cumulative stress figure of merit budget over the life of the assembly (step 610). This cumulative stress figure of merit budget may be a linear accumulation of stress allowed from first power on of the assembly to the assembly's projected end of installed life. However, the illustrative embodiments recognize that other cumulative stress figure of merit budget profiles may be considered. All cumulative stress figure of merit budget profiles are monotonically increasing functions of time, such that the FOM budget does not exceed the expected stress value before the end of installed life of the assembly. In order to minimize possibilities of over budget conditions (especially as assemblies are thoroughly wrung out by customers during customer acceptance testing) near the beginning of the installed life of an assembly, the cumulative stress figure of merit budget may start out with a non-zero value. The temperature excursion module compares the cumulative figure of merit value to the cumulative stress figure of merit budget (step 612). If at step 612 the cumulative figure of merit value fails to exceed the cumulative stress figure of merit budget, then the operation returns to step 602. If at step 612 the cumulative figure of merit value meets or exceeds the cumulative stress figure of merit budget, a thermal management module within the temperature excursion module implements an identified stress management solution (step 614), with the operation returning to step 602 thereafter.

Possible management solutions implemented by the thermal management module may comprise the addition of pseudo workloads during periods that there is no workload demand, suspending entry into nap modes (and turbo modes for situations where this would not impact customer perceived performance), delaying resumption of process activity on a core by a small time period to effectively merge high power consuming processes without substantially impacting perceived performance, dynamically throttling clock frequency and voltage to an average performance level that regulates mini-cycle stress at the cumulative criteria, scheduling housekeeping tasks to processor cores in which a further temperature decline would result in a mini-cycle of significance, scheduling processes over available cores and threads in order to minimize thermal excursions (as opposed to junction temperatures) per the cumulative thermal mini-cycle stress budget, or the like.

Thus, the illustrative embodiments provide mechanisms for monitoring the temperature excursions an assembly experiences over the life of the assembly, including magnitudes, number of thermal cycles, and the like. A stress figure of merit (FOM) is computed continuously, or at appropriate intervals, based upon stress figure of merit contributors for thermal excursion events. This FOM is compared to an accumulated budget as the life of the assembly progresses. The budget may be composed to assure that complying with such a budget will result in an acceptable failure rate and expected life of the assembly. If the budget is exceeded, then the nature of the power management would be altered such that further activities that may cause temperature excursions which could add to fatigue stress are limited until such time as the accumulated stress figure of merit will be under the budget.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for monitoring temperature excursions an assembly experiences over a life of the assembly, the method comprising:

determining, by a contributor module in the data processing system, if the assembly has been in service beyond a predetermined end of life objective;

responsive to the assembly failing to be in service beyond the predetermined end of life objective, reading, by the contributor module, a new temperature value associated with the assembly;

computing, by the contributor module, a modifier value for a figure of merit (FOM) value;

adding, by the contributor module, the modifier value to a cumulative figure of merit value;

comparing, by the contributor module, the cumulative figure of merit value to a cumulative stress figure of merit budget; and responsive to the cumulative figure of merit value exceeding the cumulative stress figure of merit budget, implementing, by the contributor module, an identified stress management solution.

2. The method of claim 1, computing the modifier to the figure of merit comprises:

once the data processing system has been initialized:

setting, by the contributor module, a time_then variable value to a time_now variable value, wherein the time variable value is set equal to a time the assembly is first initialized;

setting, by the contributor module, a temperature then (Tthen) variable value to a temperature now (Tnow) variable value, wherein the Tnow variable value is set to the initial temperature of the assembly at a time the assembly is first initialized;

reading, by the contributor module, a new time from the data processing system and setting the time_now variable equal to the new time;

reading, by the contributor module, the new temperature value from the assembly and setting the Tnow variable equal to the new temperature;

calculating, by the contributor module, a time2add2start variable value, wherein the time2add2start variable value is a time to add to a duration for calculating a current thermal cycle figure of merit (FOMcycle);

determining, by the contributor module, whether a current thermal cycle is failing to contribute to a FOMcycle increase;

responsive to the current thermal cycle contributing to the FOMcycle increase, calculating, by the contributor module, the modifier value, wherein the modifier value is a FOMcycle modifier value and wherein the FOMcycle modifier value is a contribution for the current thermal cycle being evaluated;

determining, by the contributor module, if the time2add2start variable value is equal to zero; and responsive to the time2add2start variable value equaling zero, adding, by the contributor module, the modifier value into the cumulative figure of merit value.

3. The method of claim 2, further comprising:

responsive to the time2add2start variable value failing to equal zero, adding, by the contributor module, the FOMcycle modifier value to the cumulative figure of merit value minus a virtual contribution of a portion that was added due to the time2add2start variable value.

4. The method of claim 3, wherein the virtual contribution of the portion that was added due to the time2add2start variable value is calculated, by the contributor module, using the following equation:

$$FOM_{cycle} = 0.5 \times \left| \frac{T_{now} - T_{cycle\_start}}{100} \right|^{1.9} \times \left( \frac{15 \min}{time_{2add2start}} \right)^{-1/3} \times e^{\left[ \frac{1414}{373} - \frac{1414}{(273 + \max(T_{cycle\_start}, T_{now}))} \right]}$$

wherein the (Tcycle_start) temperature variable is a temperature of a start of the current thermal cycle.

5. The method of claim 2, wherein the time2add2start variable value is calculated using the following equation:

$$time_{2add2start} = \left\{ \frac{\left( \frac{FOM_{cycle}}{0.5} \right) \times \left| \frac{T_{now} - T_{cycle\_start}}{100} \right|^{-1.9} \times}{(15 \min)^{1/3} \times e^{\left[ \frac{1414}{(273 + \max(T_{cycle\_start}, T_{now}))} \right] - \frac{1414}{373}}} \right\}^3$$

wherein the (Tcycle_start) temperature variable is a temperature of a start of the current thermal cycle.

6. The method of claim 2, wherein determining whether the current thermal cycle is failing to contribute to the FOMcycle increase comprises:

determining, by the contributor module, if a length of time since the new temperature last changed direction as given by the time2add2start variable value is at least one of longer than a predetermined time period or a negative value.

7. The method of claim 2, further comprising:

responsive to the current thermal cycle failing to contribute to the FOMcycle increase, determining, by the contributor module, if the time2add2start variable value is positive or equal to zero; and responsive to the time2add2start variable value being positive or zero, setting, by the contributor module, a Tcycle_start variable value equal to the Tthen variable value.

8. The method of claim 7, further comprising:

responsive to the time2add2start variable value being negative, setting, by the contributor module, the Tcycle_start variable value equal to the Tnow variable value.

9. The method of claim 2, wherein initializing the data processing system comprises:

setting, by the contributor module, the temperature now (Tnow) variable value equal to an initial temperature read by a thermal sensor associated with the assembly, wherein the Tnow variable value is set to the initial temperature of the assembly at a time the assembly is first initialized;

setting, by the contributor module, the time_now variable value equal to a time the assembly is first initialized;

setting, by the contributor module, the current thermal cycle (Tcycle_start) temperature variable equal to Tnow;

setting, by the contributor module, the cumulative figure of merit variable value equal to zero; and setting, by the contributor module, the FOMcycle variable value equal to zero.

10. The method of claim 1, wherein the identified stress management solution is one of a group comprising:

adding, by the contributor module, pseudo workloads during periods where there is no workload demand;

suspending, by the contributor module, entry into nap modes;

delaying, by the contributor module, resumption of process activity on a core by a small time period to effectively merge high power consuming processes without substantially impacting perceived performance;

dynamically, by the contributor module, throttling clock frequency and voltage to an average performance level that regulates mini-cycle stress at the cumulative criteria;

scheduling, by the contributor module, housekeeping tasks to processor cores in which a further temperature decline would result in a mini-cycle of significance; or scheduling, by the contributor module, processes over available cores and threads in order to minimize thermal excursions per a cumulative thermal mini-cycle stress budget.

11. The method of claim 1, wherein the figure of merit (FOM) value correlates to stress testing results using industry standard tests for qualifying electronic parts and wherein the industry standard tests are Accelerated Thermal Cycling (ATC) tests.

12. A computer program product comprising a non-statutory computer recordable medium having a computer readable program recorded thereon, wherein the computer readable program, when executed on a computing device, causes the computing device to:
determine if the assembly has been in service beyond a predetermined end of life objective;
responsive to the assembly failing to be in service beyond the predetermined end of life objective, read a new temperature value associated with the assembly;
compute a modifier value for a figure of merit (FOM) value;
add the modifier value to a cumulative figure of merit value;
compare the cumulative figure of merit value to a cumulative stress figure of merit budget; and
responsive to the cumulative figure of merit value exceeding the cumulative stress figure of merit budget, implement an identified stress management solution.

13. The computer program product of claim 12, wherein the computer readable program to compute the modifier to the figure of merit further causes the computing device to: once the data processing system has been initialized:
set a time_then variable value to a time_now variable value, wherein the time_now variable value is set equal to a time the assembly is first initialized;
set a temperature then (Tthen) variable value to a temperature now (Tnow) variable value, wherein the Tnow variable value is set to the initial temperature of the assembly at a time the assembly is first initialized;
read a new time from the data processing system and set the time_now variable equal to the new time;
read the new temperature value from the assembly and set the Tnow variable equal to the new temperature;
calculate a time2add2start variable value, wherein the time2add2start variable value is a time to add to a duration for calculating a current thermal cycle figure of merit (FOMcycle);
determine whether a current thermal cycle is failing to contribute to a FOMcycle increase;
responsive to the current thermal cycle contributing to the FOMcycle increase, calculate the modifier value, wherein the modifier value is a FOMcycle modifier value and wherein the FOMcycle modifier value is a contribution for the current thermal cycle being evaluated;
determine if the time2add2start variable value is equal to zero; and
responsive to the time2add2start variable value equaling zero, add the modifier value into the cumulative figure of merit value.

14. The computer program product of claim 13, wherein the computer readable program to determine whether the current thermal cycle is failing to contribute to the FOMcycle increase further causes the computing device to:
determine if a length of time since the new temperature last changed direction as given by the time2add2start variable value is longer than a predetermined time period or if the length of time since the new temperature last changed direction as given by the time2add2start variable value has changed direction so that the time2add2start variable value is a negative value.

15. An apparatus, comprising:
a processor; and
a memory coupled to the processor, wherein the memory comprises instructions which, when executed by the processor, cause the processor to;
determine if the assembly has been in service beyond a predetermined end of life objective;
responsive to the assembly failing to be in service beyond the predetermined end of life objective, read a new temperature value associated with the assembly;
compute a modifier value for a figure of merit (FOM) value;
add the modifier value to a cumulative figure of merit value;
compare the cumulative figure of merit value to a cumulative stress figure of merit budget; and
responsive to the cumulative figure of merit value exceeding the cumulative stress figure of merit budget, implement an identified stress management solution.

16. The apparatus of claim 15, wherein the instructions to compute the modifier to the figure of merit further cause the processor to:
once the data processing system has been initialized:
set a time_then variable value to a time_now variable value, wherein the time_now variable value is set equal to a time the assembly is first initialized;
set a temperature then (Tthen) variable value to a temperature now (Tnow) variable value, wherein the Tnow variable value is set to the initial temperature of the assembly at a time the assembly is first initialized;
read a new time from the data processing system and set the time_now variable equal to the new time;
read the new temperature value from the assembly and set the Tnow variable equal to the new temperature;
calculate a time2add2start variable value, wherein the time2add2start variable value is a time to add to a duration for calculating a current thermal cycle figure of merit (FOMcycle);
determine whether a current thermal cycle is failing to contribute to a FOMcycle increase;
responsive to the current thermal cycle contributing to the FOMcycle increase, calculate the modifier value, wherein the modifier value is a FOMcycle modifier value and wherein the FOMcycle modifier value is a contribution for the current thermal cycle being evaluated;
determine if the time2add2start variable value is equal to zero; and
responsive to the time2add2start variable value equaling zero, add the modifier value into the cumulative figure of merit value.

17. The apparatus of claim 16, wherein the instructions to determine whether the current thermal cycle is failing to contribute to the FOMcycle increase further causes the processor to:

determine if a length of time since the new temperature last changed direction as given by the time2add2start variable value is longer than a predetermined time period or if the length of time since the new temperature last changed direction as given by the time2add2start variable value has changed direction so that the time2add2start variable value is a negative value.

18. The method of claim 2, wherein the FOMcycle modifier value is calculated using the following equation:

$$FOM_{cycle} = 0.5 \times \left| \frac{T_{now} - T_{cycle\_start}}{100} \right|^{1.9} \times \left( \frac{15 \min}{time_{2\,add\,2\,start} - time_{then} + time_{now}} \right)^{-1/3} \times e^{\left[ \frac{1414}{373} - \frac{1414}{(273 + max(T_{cycle\_start}, T_{now}))} \right]}$$

wherein the (Tcycles_start) temperature variable is a temperature of a start of the current thermal cycle.

19. The computer program product of claim 13, wherein the FOMcycle modifier value is calculated using the following equation:

$$FOM_{cycle} = 0.5 \times \left| \frac{T_{now} - T_{cycle\_start}}{100} \right|^{1.9} \times \left( \frac{15 \min}{time_{2\,add\,2\,start} - time_{then} + time_{now}} \right)^{-1/3} \times e^{\left[ \frac{1414}{373} - \frac{1414}{(273 + max(T_{cycle\_start}, T_{now}))} \right]}$$

wherein the virtual contribution of the portion that was added due to the time2add2start variable value is calculated using the following equation:

$$FOM_{cycle} = 0.5 \times \left| \frac{T_{now} - T_{cycle\_start}}{100} \right|^{1.9} \times \left( \frac{15 \min}{time_{2\,add\,2\,start}} \right)^{-1/3} \times e^{\left[ \frac{1414}{373} - \frac{1414}{(273 + max(T_{cycle\_start}, T_{now}))} \right]}$$

and, wherein the time2add2start variable value is calculated using the following equation:

$$time_{2\,add\,2\,start} = \left\{ \left( \frac{FOM_{cycle}}{0.5} \right) \times \left| \frac{T_{now} - T_{cycle\_start}}{100} \right|^{-1.9} \times (15 \min)^{1/3} \times e^{\left[ \frac{1414}{(273 + max(T_{cycle\_start}, T_{now}))} \right] - \frac{1414}{373}} \right\}^3$$

wherein the (Tcycle_start) temperature variable is a temperature of a start of the current thermal cycle.

20. The apparatus of claim 16, wherein the FOMcycle modifier value is calculated using the following equation:

$$FOM_{cycle} = 0.5 \times \left| \frac{T_{now} - T_{cycle\_start}}{100} \right|^{1.9} \times \left( \frac{15 \min}{time_{2\,add\,2\,start} - time_{then} + time_{now}} \right)^{-1/3} \times e^{\left[ \frac{1414}{373} - \frac{1414}{(273 + max(T_{cycle\_start}, T_{now}))} \right]}$$

wherein the virtual contribution of the portion that was added due to the time2add2start variable value is calculated using the following equation:

$$FOM_{cycle} = 0.5 \times \left| \frac{T_{now} - T_{cycle\_start}}{100} \right|^{1.9} \times \left( \frac{15 \min}{time_{2\,add\,2\,start}} \right)^{-1/3} \times e^{\left[ \frac{1414}{373} - \frac{1414}{(273 + max(T_{cycle\_start}, T_{now}))} \right]}$$

and, wherein the time2add2start variable value is calculated using the following equation:

$$time_{2\,add\,2\,start} = \left\{ \left( \frac{FOM_{cycle}}{0.5} \right) \times \left| \frac{T_{now} - T_{cycle\_start}}{100} \right|^{-1.9} \times (15 \min)^{1/3} \times e^{\left[ \frac{1414}{(273 + max(T_{cycle\_start}, T_{now}))} \right] - \frac{1414}{373}} \right\}^3$$

wherein the (Tcycle_start) temperature variable is a temperature of a start of the current thermal cycle.

* * * * *